(No Model.)
J. LEWIS.
MEASURING APPARATUS FOR LIQUIDS.
No. 503,149. Patented Aug. 15, 1893.
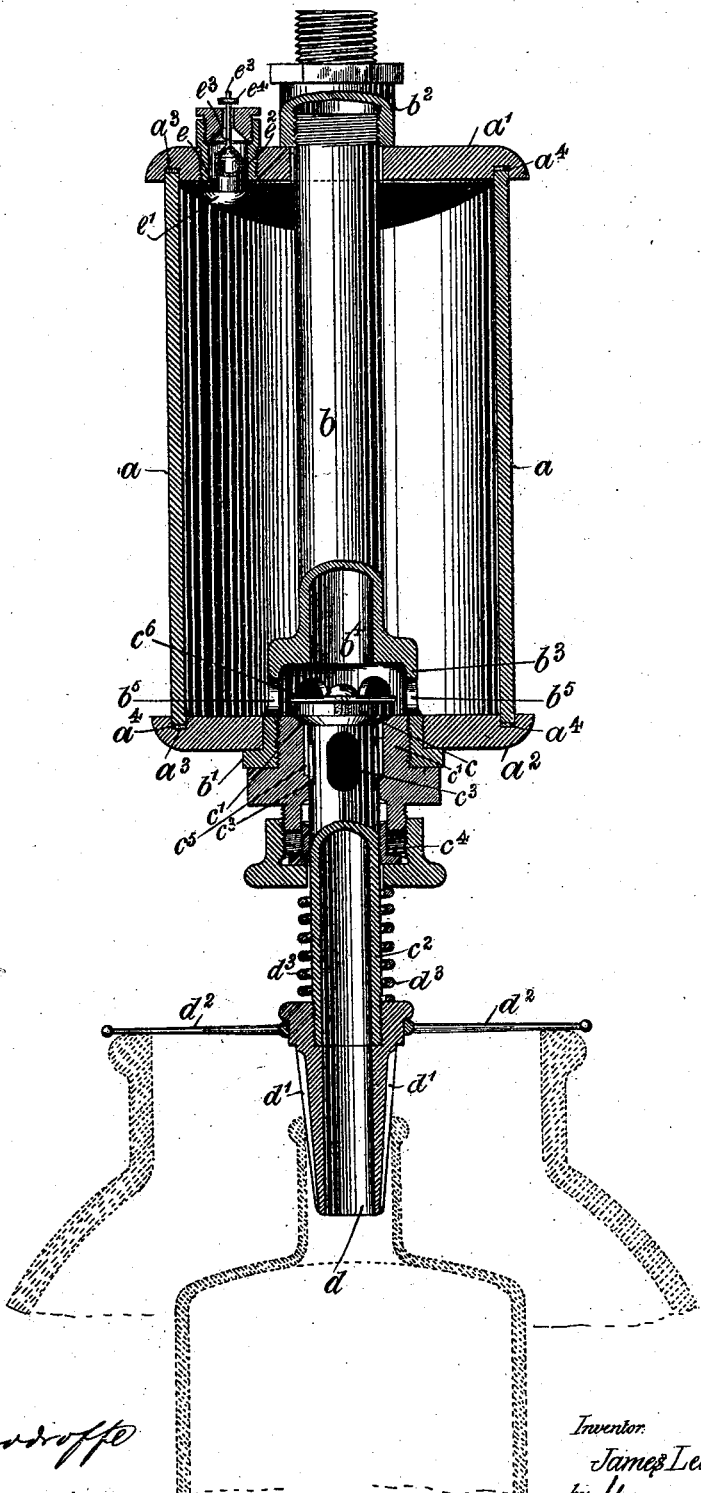
Witnesses:
Chas. S. Woodroffe
Robt. A. Blake.
Inventor:
James Lewis
by Henry H. Leigh
Attorney.

UNITED STATES PATENT OFFICE.

JAMES LEWIS, OF PENARTH, ENGLAND.

MEASURING APPARATUS FOR LIQUIDS.

SPECIFICATION forming part of Letters Patent No. 503,149, dated August 15, 1893.

Application filed May 8, 1893. Serial No. 473,614. (No model.) Patented in England October 31, 1892, No. 19,572.

*To all whom it may concern:*

Be it known that I, JAMES LEWIS, a subject of the Queen of the United Kingdom of Great Britain and Ireland, residing at Penarth, in the county of Glamorgan, in the Principality of Wales, England, have invented certain new and useful Improvements in Apparatus for Measuring a Liquid on its Way into Bottles or the Like Vessels, (for which I have obtained the following patent: Great Britain and Ireland, No. 19,572, dated October 31, 1892;) and I do hereby declare that the following is a full, clear, and exact description of the invention, reference being made to the accompanying drawing, which is to be taken as part of this specification and read therewith, and one which will enable others skilled in the art to which it appertains to make and use the same.

My invention relates to improvements in apparatus for measuring and delivering a given quantity of liquid into a bottle or similar vessel.

It consists essentially in the combination with a measuring vessel of a delivery pipe and its valve, the latter adapted to open the former by being pushed up from its seat by the bottle to be filled and to be shut down thereupon by a spring as the bottle is being removed from the nozzle of the said pipe.

The said invention includes the combination with the measuring vessel of a pipe adapted to deliver the liquid in question from the reservoir into the said vessel through ports controlled by the valve above mentioned and an automatic valve adapted to control the passage of air to and from the measuring vessel as well as to close the latter against the overflow of liquid. It is therefore specially adapted for use in bottling wines or spirits from the wood into bottles, but is provided with an attachment by means of which it can be caused to deliver into a wide mouthed vessel such as a jar or a cup.

The accompanying figure is a sectional elevation of the measuring apparatus empty. The liquid valve is therefore down on its seat, and the air valve open. The dotted lines indicate the way the invention is actuated by either a jar or by a bottle.

The measuring vessel is of any convenient shape and material. In point of shape, I prefer that it should be cylindrical, and as to material, I prefer that it should be of glass because that is transparent. The contents of the measuring vessel is the maximum quantity which it will deliver at one time of using. The vessel illustrated consists of a cylinder $a$ held between two disks $a'$, $a^2$. Each of these has turned in its face a circular groove $a^3$ of a proper diameter to receive the respective end of the cylinder as well as the necessary packing $a^4$. The pair of disks $a'$, $a^2$ are held to the cylinder $a$ by one or more ties. I prefer to make use of the supply pipe by which the liquid is delivered into the vessel.

$b$ is the supply pipe in question. The bottom end of it is enlarged to make a chamber in which the delivery valve can work and have its seat, and is provided with a flange $b'$. The opposite end of the said tube is screwed into a socket $b^2$ which is a part of the coupling to which is connected the pipe through which the liquid to be measured flows into the measuring vessel. The disks $a'$, $a^2$ are each bored out centrally to pass the respective ends of the pipe $b$, and the above mentioned parts of the measuring vessel are held together between the flange $b'$ and the socket $b^2$.

The measuring vessel is held in a fixed position by any suitable device. It is not shown in the drawing, partly because it is not a part of the invention, and partly because it may be modified as to shape and kind to any extent as circumstances may render necessary.

$b^3$ is the valve chamber already mentioned as provided by the enlargement of the pipe $b$. The end $b^4$ of the pipe is the port through which the liquid flows into the valve chamber.

$b^5$, $b^5$ are ports in the side of the chamber. Their function is twofold, to pass liquid from the valve chamber into the measuring vessel, and the same liquid afterward from the latter through the said chamber to the delivery pipe.

$c$ is the valve. Its function is to close the port $b^4$ and to open the ports in the delivery pipe, alternately and vice versa. It has its seat upon a ring $c'$ which is screwed into the chamber $b^3$. This ring and the valve $c$ together (when the latter is on its seat) close the bottom side of the said chamber.

$c^2$ is the delivery pipe. It is, in fact, the hollow spindle of the valve $c$. $c^3$, $c^3$ is a series of ports in the said pipe, near to the valve.

$c^4$ is a stuffing box upon the opposite end of the ring $c'$. The lower and plain portion of the pipe or stem $c^2$ works up and down through it.

$c^5$ is an annular chamber in the inner face of the ring $c'$ facing the ports $c^3$.

The opposite faces of the chamber $b^3$ and the top of the valve $c$ correspond in respect of shape. Either face may be packed with an elastic substance such as india-rubber or vulcanite. The drawing shows such a facing $c^6$ upon the top of the valve.

$d$ is a nozzle on the end of the delivery pipe $c^2$ and aligned therewith. This nozzle is preferably tapered, and has one or more vertical grooves $d'$ cut in its outer face to provide for the escape of air from the bottle which is being filled.

$d^2, d^2$ are arms projecting radially from the nozzle $d$. They are provided for the purpose of being engaged by the rim or the mouth of a jar or cup.

$d^3$ is a spring acting between the stuffing box and some fixed portion of the delivery pipe or nozzle for the purpose of keeping the valve down upon its seat.

$e$ is an air port. It is formed in the top of the measuring vessel. It is controlled by an automatic valve $e'$ which is adapted to work in a vertical direction only. It is heavier than air, so that as the liquid falls in the measuring vessel it follows it and admits air into the said vessel. It is lighter than the liquid, so that as the latter rises in the measuring vessel, the valve will be closed by it up against its seat $e^2$. Some device is necessary to prevent the valve dropping from its seat into the vessel. I have shown one consisting of a spindle $e^3$ and a stopnut $e^4$, but any equivalent capable of preventing such dropping may be adopted.

The operation of my invention is as follows: When the liquid is turned on to the pipe $b$ from the reservoir, it flows down it and through the chamber $b^3$ and the ports $b^5$ into the measuring vessel till the latter is filled. By the time that this has been effected, the air valve $e'$ has been closed. When it is seen that the vessel is full, the bottle or jar destined to receive the measured quantity of liquid, is pushed up against the nozzle $d'$ or the arms $d^2$, as the case may be, with sufficient force to lift the valve $c$ off its seat $c'$ and to make it close the port $b^4$. The liquid then in the measuring vessel flows through the ports $b^5$, the chamber $b^3$ and the ports $c^3$ into the discharge pipe, and down into the said bottle or jar. When the latter has received all the said quantity of liquid, the bottle or jar is removed from the nozzle or the force with which it was pressed up against the latter slackened, whereupon the spring $d^3$ will pull the valve $c$ down upon its seat, thereby closing the ports $c^3$ and opening the port $b^4$. A fresh quantity of liquid then fills the measuring vessel.

I claim—

1. The combination of vessel of a definite capacity, a supply pipe adapted to supply liquid into the said vessel, a port at the bottom end of the said pipe, a delivery pipe from the bottom of the said vessel and a valve adapted to normally hold the delivery pipe closed when in one terminal position and open the latter and close the port above mentioned when it is pushed off its seat into the other terminal position, as set forth.

2. The combination of measuring vessel, supply pipe adapted to deliver liquid into the said vessel at or near the bottom level thereof, a delivery pipe from the bottom of the said vessel, their adjacent ends being axially aligned with each other, ports in the said delivery pipe, a valve fixed on the head of the said delivery pipe capable of motion between two terminal positions and adapted when in one to hold the supply pipe closed and the delivery pipe open, and vice versa, a spring device for keeping the delivery pipe closed, and an automatic device for providing for the escape of air from the measuring vessel and preventing the overflow of liquid from it, as set forth.

3. The combination with a measuring vessel of a pipe adapted to supply liquid to the said vessel, a chamber within the said vessel and being an extension of the said pipe, a port being the end of the said pipe, ports in the side of the said chamber, a delivery pipe from the bottom of the said chamber, a valve, being fast to the top of the said delivery pipe, adapted to close either the said end of the supply pipe or the delivery pipe according to its terminal position, a stuffing box through which the delivery pipe works and ports in the said delivery pipe adapted to open to the said chamber, a spring adapted to keep the delivery pipe closed by the said valve, a nozzle being the bottom end of the delivery pipe adapted to receive the pressure of the bottle or jar to be filled, and an automatic device adapted to allow of the escape of air from the measuring vessel and to close it against the overflow of liquid, as set forth.

In witness whereof I have hereunto affixed my signature, in presence of two witnesses, this 17th day of April, 1893.

JAMES LEWIS.

Witnesses:
SAMUEL W. ALLEN,
*Exchange Buildings, Cardiff.*
FRANK HOWELL,
*9 Lead Street, Cardiff.*